Feb. 13, 1968     H. C. GLOVER, JR     3,368,581

VALVE FOR ACETYLENE GAS AND THE LIKE WITH SAFETY SHUT-OFF

Filed Sept. 24, 1965

INVENTOR.
HOMER CLIFTON GLOVER, JR.
BY *F. R. Geisler,*
ATTORNEY

United States Patent Office 3,368,581
Patented Feb. 13, 1968

3,368,581
VALVE FOR ACETYLENE GAS AND THE LIKE
WITH SAFETY SHUT-OFF
Homer Clifton Glover, Jr., 16065 NE. Rose Parkway,
Portland, Oreg. 97230
Filed Sept. 24, 1965, Ser. No. 489,838
4 Claims. (Cl. 137—460)

ABSTRACT OF THE DISCLOSURE

A control valve for acetylene gas so constructed and arranged that, when the valve is open to allow the pressurized gas to pass through the gas line, any violent back pressure in the line will automatically cause the valve to close and to remain closed at least for the duration of the back pressure unless the valve is manually re-set during that time; the valve assembly, furthermore, having means causing some of the force and heat of a back pressure wave to be dissipated in the event the valve is not fully closed.

---

This invention relates in general to valves adjustably operable to control and to turn on or shut off the passage of gas under pressure through a flow line and also capable of acting automatically to shut off such flow in the event any dangerous back pressure develops.

More specifically, the invention relates to an on-off or flow control valve for use in combination with a cylinder, tank, or other pressurized source for acetylene or similar highly flammable gas, where a sudden violent back pressure over the flow line, unless immediately interrupted or checked, could be highly dangerous.

An object of the invention is to provide a novel and improved valve assembly for acetylene gas and the like which will operate normally to control the passage of the gas through the valve assembly as desired, but which, in the event of sudden explosive back pressure, such as a flame-front and/or detonation wave, occasioned by fire or other explosion, will automatically and instantly close, thereby arresting the flashback to the gas supply source.

Another object of the invention is to provide an improved valve assembly which will close automatically in the event of such flashback or violent back pressure wave, and which will then remain closed as long as such back pressure continues, unless the operator desires to open the valve assembly regardless of the high back pressure.

A further object is to provide a combined on-off or flow valve and safety shut-off valve which will become completely closed automatically in the event of excessive back pressure and which then will remain closed even after such back pressure has abated, until again opened by the operator.

An additional object of the invention is to provide a novel control valve assembly in which any back pressure wave, even though in whole or in part passing back through the valve assembly, will be so divided and slowed down as to be rendered less dangerous.

Another object is to provide an improved gas on-off control and automatic back pressure shut-off valve assembly adapted to be mounted directly on the cylinder or tank serving as the container for pressurized acetylene gas, and thus act as a more or less permanent attachment for such cylinder or tank and functioning both during the filling of the cylinder as well as any subsequent dispensing of the pressurized gas from the cylinder by the consumer.

A still further object of the invention is to provide a novel on-off control and safety shut-off valve assembly, particularly adapted for commercial acetylene gas tanks, which will be simple and practical in construction, relatively moderate in cost, and presenting no particular maintenance problem.

Figure 1:
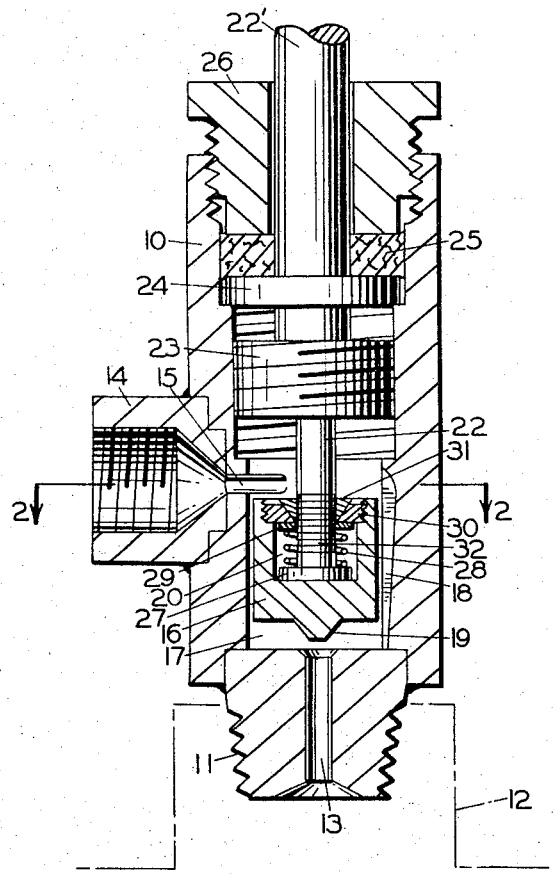
Figure 3:
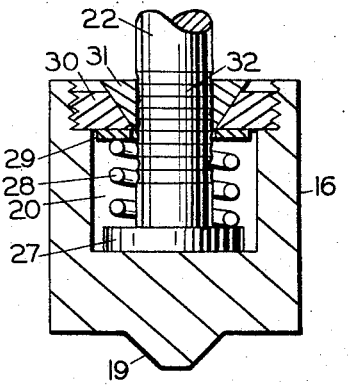
Figure 2:
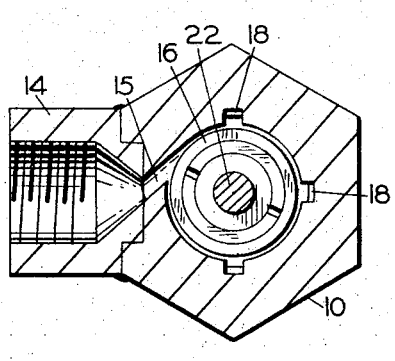

The manner in which these objects and other incidental advantages are attained by the valve of the present invention, and the construction and manner of operation of the valve will be readily understood from the following brief description with reference to the accompanying drawings, wherein:

FIG. 1 is a sectional elevation of the valve assembly;
FIG. 2 is a section on the line indicated on 2—2 in FIG. 1; and
FIG. 3 is a fragmentary enlarged sectional elevation of the valve piston alone.

Referring first to FIG. 1, the body of the valve assembly comprises a main housing member 10, the outside wall of which may be hexagonal in cross section, as shown in FIG. 2, or cylindrical or any other desired contour. A bottom housing member 11 is formed integral with, or rigidly secured to a main housing member 10, for example, by welding. This bottom member 11 is screw threaded on its lower outer wall and adapted to be tightly screwed into the threaded neck of a gas cylinder or tank, the top of which is indicated in part by the broken line 12 in FIG. 1, thus such a tank as that in which acetylene gas is customarily supplied. A central channel 13 extends up through the bottom member 11 and provides a passageway connecting the tank 12 with the bottom of a chamber 17 in the lower portion of the valve housing.

A nipple 14 is formed integral with the main housing 10 or is firmly secured thereto, for example, by welding, and this nipple connects with a port 15 extending through the wall of the member 10. The nipple 14 is threaded on the inside and is adapted to be connected up with the customary hose, tubing or pressure regulating valve (not shown) through which the gas passes.

A valve plug or piston 16 is positioned for up and down limited movement in the bottom chamber 17 of the housing. Preferably, although not necessarily, the inside wall of the chamber 17 is cylindrical, and the outside wall of the piston 16 is shaped correspondingly, allowing ample clearance for the up and down movement of the piston 16 in the chamber 17. This clearance between the piston and the chamber wall may be sufficient of itself to permit the desired flow of gas to pass from the bottom to the top of the chamber 17 between the piston and the surrounding wall of the chamber, or the chamber or piston may preferably be formed with grooves 18 (see also FIG. 2) parallel to the common axis of the chamber and piston and extending from the bottom of the chamber up beyond the top of the piston.

The bottom surface of the piston is formed with a central tapered extension 19 designed to act as a tightly fitting plug for the tapered top end of the channel 13 in the bottom member 11 when the piston is in lowered closed position.

The port 15 in the top of the chamber 17, which extends through the wall of the housing member 10 extends in the relative position shown in FIG. 2, that is, this port channel follows a line substantially tangent to the inner cylindrical wall of the chamber 17. The reason for having the port channel extend in this direction will be mentioned later.

The valve plug or piston 16 is formed with a central recess 20 extending down into the piston from the top. The top of this recess is partly closed by a retainer ring 30. A reduced diameter portion 22 of the valve stem extends down into this piston recess 20. The upper portion 22' of the valve stem, or operating shaft for the piston and valve, is of larger diameter as shown in FIG. 1. A mounting disc 23, integral with the lower and upper portions 22 and 22' of the valve stem, has its outer cylindrical wall screw threaded for engagement with the corresponding screw threads on the inside wall of the housing 10, which threads are located above the chamber 17, as shown in FIG. 1.

The upper portion 22' of the valve stem passes through a ring 24, which rests on a shoulder on the inside wall of the housing 10, and then passes through a suitable packing gland 25, and thence through a central channel in a top plug 26 of the housing assembly. A handle or other suitable manipulating means (not shown) is connected with the top end of the larger diameter portion 22' of the valve stem for rotating the valve stem and thereby causing movement of the valve piston 16 up or down for opening and normal closing of the valve assembly as desired.

The bottom end of the valve stem portion 22 is provided with a collar 27. A coil spring 28 is carried on the valve stem within the recess 20 of the valve piston 16. The ends of the coil spring 28 bear against the collar 27 and against a top washer 29 respectively, the washer 29 in turn bearing against the underside of the retainer ring 30. The coil spring 28 is under compression at all times and thus normally maintains the valve piston with the bottom wall of the piston recess 20 in contact with the bottom end of the stem 22.

Thus normally, when the valve assembly is opened, the valve piston remains in the raised position in which it is set by the manual rotation of the valve stem 22, 22', the piston in raised position (as illustrated in FIG. 1) permitting the gas to flow through channel 13, then past the valve piston 16 to the top of the housing chamber 17, and thence out through the port 15 and nipple 14 to the delivery hose or conduit (not shown) connected to the nipple 14. The lowering of the valve piston 16, as apparent, prevents the passage of gas from the tank 12 to the housing chamber 17 and shuts off communication between the valve assembly and the gas tank 12.

It will be apparent from FIG. 1, due to the spring mounting of the valve piston 16 on the valve stem 22, that, when the piston is in normal open or raised position as illustrated in this figure, a downward pressure on the top of the raised piston which is sufficient to overcome the force exerted by this spring 28 will thrust the piston downwardly momentarily to closed position against the force of the spring. Thus, when the piston is in the normal raised position shown in FIG. 1, allowing the desired flow of gas to take place through the valve assembly and out from the port 15 through the service line, a sudden excessive back pressure, produced by an explosion or flashback on the service line, resulting in excessive back pressure on the top of the valve piston 16, will thrust the valve piston down into closed position against the force of the spring 28 and thus close off the bottom channel 13 and the gas supply cylinder 12.

However, in the event the back pressure through the service line is not strong enough to force the piston down to closed position, or if for any other reason the piston should not close or react immediately, the back pressure wave would nevertheless have to follow a roundabout reducing and cooling course. Thus the back pressure wave, entering into the housing 17 above the piston 16 through the port 15, would first travel a circuitous path in the top of the chamber 17 above the piston 16 because of the fact that the back pressure would enter into the top of the cylindrical chamber in the tangential direction due to the positioning of the port 15. Then such back pressure wave would have to pass downwardly either through the clearance spacing between the outer wall of the piston and the wall of the chamber 17, or down through the grooves 18 in the chamber wall, if such grooves were provided, in order to reach the bottom of the chamber 17 and eventually reach the bottom channel 13. The result would be that the back pressure wave would be subjected to some cooling and some dissipation of its force even though the piston remained in raised position.

Should a back pressure occur in the service line, sufficient to thrust the piston down into closed position, but should the operator nevertheless desire to keep the valve open in spite of such back pressure, he could of course do so by rotating the valve stem 22, 22' sufficiently to raise the piston in excess of the distance to which the piston can be moved downwardly against the force of its spring 28.

Preferably, but not necessarily, the inner periphery of the retaining ring 30 is sloped upwardly outwardly and so formed as to provide a seat for an added inner ring 31 which is wedge-shaped in cross section. This wedge-shaped ring 31 is formed of flexible, relatively soft metal or other material, or else of readily fusible material, so that the application of excessive pressure downward against the top of this ring 31, or the sudden application of heat together with pressure, will cause this ring to become gripped or fused to the stem 22. When this occurs the result is that the piston 16, being thrust downwardly against the force of its spring 28, will remain in such relative position with respect to the valve stem 22, due to the action of this distorted ring 31, even when such back pressure ceases. To facilitate such "freezing" of the piston to the valve stem in the lowered position in this manner, the valve stem preferably is provided with serrations 32, or other surface roughness (FIG. 3), to facilitate engagement by the distorted ring 31 under such circumstances. However, even if the piston 16 becomes "frozen" to the valve stem by the ring 31, the piston can still be raised and the valve again opened when so desired by the operator, merely through the further rotating of the valve stem for the piston 16.

The valve assembly of this invention, unlike some other flashback arrestors, is adapted and intended for being mounted directly on the acetylene gas cylinder and thus to become part of the cylinder assembly furnished by the gas supplier. Furthermore the valve assembly provides a desirable safety feature during the filling of the tank by the supplier as well as during the employment of the gas by the consumer. Thus the valve in open position enables the filling of the tank by the supplier to take place, but should any dangerous high pressure wave occur in the supply line to the tank during the filling of the tank the valve assembly would act automatically to close off the line to the tank.

Minor modifications in the construction of the valve assembly would be possible without departing from the principle of the invention. It is not intended to limit the embodiment of the invention to the exact construction illustrated and described or otherwise than as set forth in the claims.

I claim:

1. A gas on-off flow control valve and flashback arrestor assembly comprising a housing having an enclosed chamber, means connecting said chamber with a gas supply container, a channel in said means leading into the bottom of said chamber, a valve piston in said chamber, means on the bottom of said piston closing said channel when said piston is in lowered position, a valve stem for said piston extending up through the top of said housing having threaded engagement with said housing above said chamber, said piston having a recess extending down into said piston from the top, the lower end of said valve stem contained in said recess, a coil spring on said valve stem in said recess, a spring-engaging element on the bottom of said stem, an internal shoulder in the top of said recess, said element and said shoulder engaging the ends of said spring respectively and holding said spring under tension, said spring normally maintaining the bottom of said recess in contact with the bottom end of said valve stem but enabling said piston when in raised position to be thrust down into lower position against the force of said spring if sufficient downward pressure is exerted on said piston to overcome the force of said spring, a port in the top of said chamber extending through the wall of said housing, said port located above the top of said piston when said piston is in raised position, said piston occupying most of the space in said chamber below said port so as to form with the wall of said chamber a restricted gas passageway area between said port and the bottom of said chamber, and means for connecting a delivery conduit with said port.

2. The device as set forth in claim 1 with said port in the top of said chamber extending in a tangential direction with respect to the wall of said chamber, whereby a back pressure surge through said port will follow a substantially circular path in the top of said chamber before proceeding further in said chamber.

3. The device as set forth in claim 1 with said gas passageway area from the bottom to the top of said chamber including a plurality of small grooves in the wall of said chamber, whereby a back pressure surge passing down from the top to the bottom of said chamber between said piston and said chamber wall will be distributed among said grooves and thereby cooled and weakened.

4. The device as set forth in claim 1 with the addition of a ring substantially wedge-shaped in cross section and of ductile, pliable, relatively soft material mounted in the top of said piston surrounding said valve stem, said top of said piston surrounding said valve stem having a corresponding wedge-shaped surface in contact with and accommodating said ring, whereby a heavy back pressure surge on the top of said piston, forcing said piston down against the force of said spring, will cause said ring to grip said stem and hold said piston down even though said back pressure is subsequently reduced.

References Cited

UNITED STATES PATENTS

| 560,695 | 5/1896 | Dodge | 251—83 |
| 2,839,265 | 6/1958 | Hobbs | 251—85 |
| 3,196,902 | 7/1965 | Richmond | 137—504 |

FOREIGN PATENTS

| 125,145 | 5/1945 | Australia. |
| 1,252,024 | 12/1960 | France. |

M. CARY NELSON, *Primary Examiner.*

R. C. MILLER, *Assistant Examiner.*